TAPE HAVING DATA-PROCESSING INFORMATION PERMANENTLY RECORDED THEREON

Filed Sept. 21, 1966

INVENTOR
GEORGE BEREZOV

BY Irving Seidman
ATTORNEY.

United States Patent Office 3,471,684
Patented Oct. 7, 1969

3,471,684

TAPE HAVING DATA PROCESSING INFORMATION PERMANENTLY RECORDED THEREON

George Berezov, Commack, N.Y., assignor of one-half to Irving Seidman, New York, N.Y.

Filed Sept. 21, 1966, Ser. No. 581,008
Int. Cl. G06k 7/08
U.S. Cl. 235—61.11 7 Claims

ABSTRACT OF THE DISCLOSURE

A data-processing record which includes a longitudinal strip of film having longitudinally spaced rows of transversely spaced spots thereon. The areas between the rows and the spots are of a first color. The spots are of either a second or a third color in accordance with the data which is to be recorded on the strip. Each spot represents a bit of data. Reading means is provided for detecting the color of the spots in a row and for producing electric signals representative of the data recorded on the strip.

This invention relates generally to a data-processing tape for a device utilizing a binary-coded input such as a computer and, more particularly, pertains to a tape having information permanently recorded thereon so that the information cannot be altered or removed.

Presently, so-called magnetic tapes are utilized to store data and to provide input signals for devices which use data in binary form such as computer and the like. These tapes normally contain rows of transversely spaced magnectic spots or "bits" on a ferric oxide coating. If a spot is of north magnetic polarity it represents a "1" in binary notation; if the spot is of south magnetic polarity it represents "0" in binary notation. The sequence of the north and south magnetized spots in any one row represents a piece of data or information which is translated into appropriate electrical signals by the associated machine to control the operation of the machine. While this type of arrangement provides an efficient means for storing and supplying input data signals to an associated machine there are many drawbacks associated with the use of magnetic tapes.

For example, magnetic tapes are not permanent and, therefore, they may be tampered with to provide false information. That is, any unauthorized personnel who obtains a particular magnetic tape having information recorded thereon may easily change the sequence of the magnetic spots on the tape to represent data which he wishes the tape to reflect. When it is recognized that these tapes are used to maintain, for example, bank records which include the amount of money in a particular account, it becomes obvious that the non-permanency of magnetic tapes presents a great problem. Moreover, the data stored on a magnetic tape may be easily destroyed, either accidentally or on purpose, simply by passing the tape through a magnetic field which alters the polarity of the spots on the magnetic tape.

An additional drawback to the use of magnetic tapes is due to the fact that the data recorded on the tape can be extracted only by using expensive equipment to convert the magnetized spots into information which may be easily understood. In other words, there is no manner of determining the sequence of the magnetized spots on the tape without the use of costly accessory equipment.

Accordingly, the desideratum of the present invention is to provide a tamper-proof tape for storing information in binary form.

Another object of the present invention is to provide a tape for storing and supplying binary encoded data to an associated device in which the data stored on the tape cannot be altered or erased.

A further object of the present invention is to provide a tape for storing binary encoded data wherein the data may be read directly from the tape without the necessity for utilizing expensive equipment to translate the data on the tape into comprehensible information as in prior art systems.

In furtherance of the above objects, the device of the present invention comprises a continuous tape in the form of a strip of film. Provided on the film are longitudinally spaced rows of transversely spaced colored spots. Each one of the spots represents an information bit. Thus, a binary "1" is represented by a spot having a first color and a binary "0" is represented by a spot having a second color. Additionally, the area between the spots is a third color. Thus, simply by noting the sequence of the colored spots forming a row the operator may easily read the information stored on the tape. It is to be noted that since the colored spots on the film are permanent the film cannot be erased accidentally or otherwise thereby to provide a substantially tamper-proof record which cannot be altered. Additionally, means are provided to certify the film as an original record thereby to prevent duplication of the data recorded on the film.

The data on the tape may be converted into electrical signals by moving the film past photo-electric cells which are responsive to either the first or the second color. Thus, the cells will produce a signal representative either of a binary "1" or "0" depending upon the color of the sensed spot.

A feature of the present invention is to provide a permanent tape for the storage and production of data in binary form on a colored film to provide a substantially tamper-proof record of the information.

Other features and advantages of the present invention will become apparent from a consideration of the following detailed description when taken in conjunction with the accompanying drawings, in which.

Figures 1, 2, 3, 4:
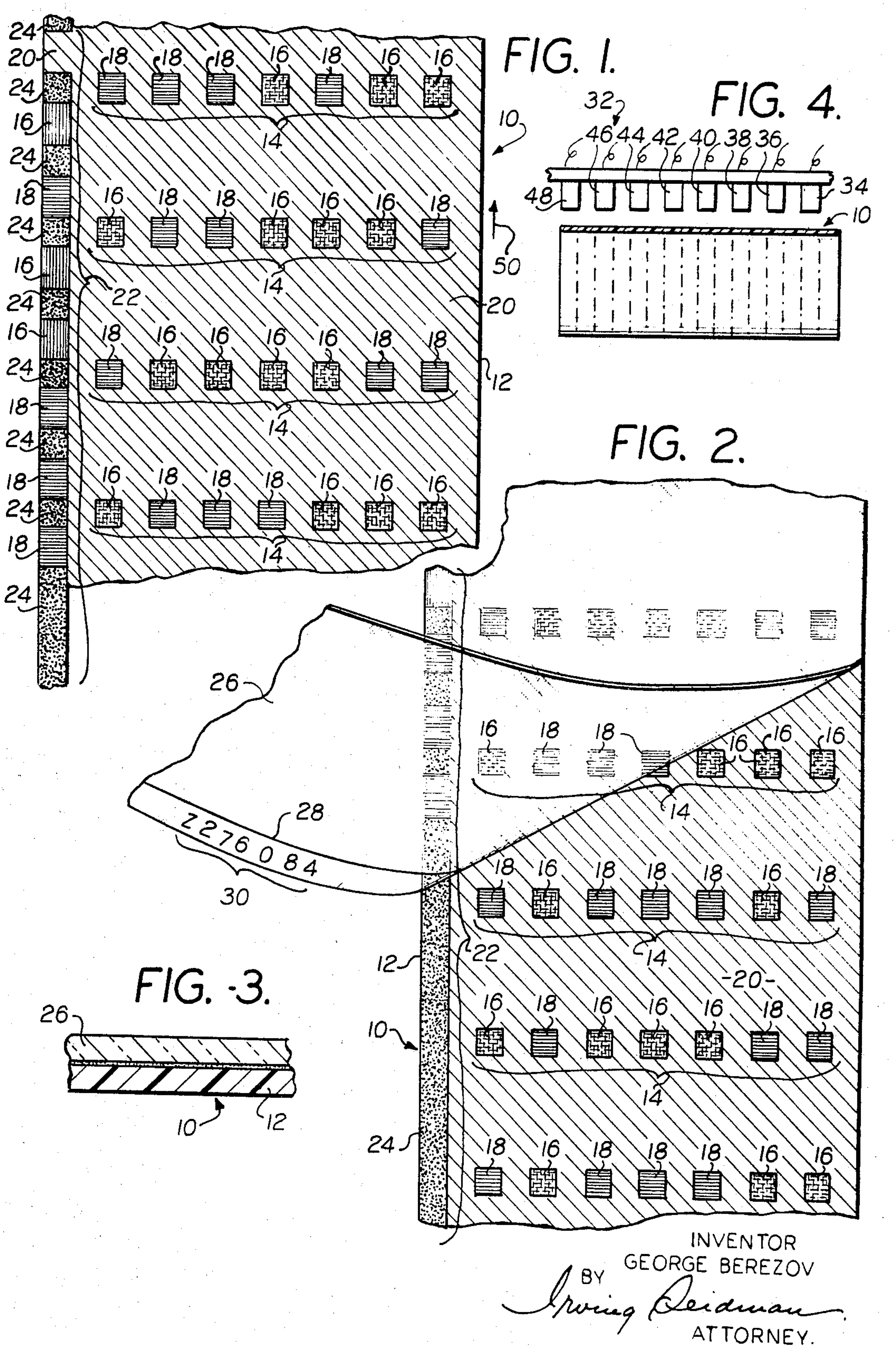
FIG. 1 is a top plan view of a section of film forming a portion of a tape constructed in accordance with the present invention.
FIG. 2 is a top plan view of the tape shown in FIG. 1, illustrating the bonding of a transparent covering having indicia thereon to prevent duplication of the tape by photocopying.
FIG. 3 is a fragmentary vertical sectional view of the tape shown in FIG. 2 with the transparent material bonded thereto.
FIG. 4 is a side elevational view of apparatus which may be utilized to convert the information recorded on film constructed according to the present invention into appropriate electrical signals.

The data-processing tape constructed in accordance with the present invention is illustrated in FIGS. 1–3 and is designated generally by the numeral 10. The tape 10 is in the form of a continuous strip of colored photographic film 12. In the description which follows, it will be noted that the film strip 12 is composed of specific colors. However, it is specifically emphasized that the colors which are specified hereinbelow are for illustrative purposes only and are not to be interpreted as a limitation on the present invention. That is, various combinations of colors may be utilized to record information on the tape 12, the only limitation being that the background or bias color of the tape and the colors representing binary "1" and "0" be different.

Provided on the film strip 12 are longitudinally spaced rows 14 of differently colored spots. Each of the rows 14 includes seven spots, each one of which is transversely spaced from the next adjacent spot. The colored spots forming a row 14 may be one of two different colors. For example, the spots 16 are yellow in color and the spots 18 are cyan in color. The background area 20 between the rows 14 and adjacent ones of the spots on the film strip 12 is colored green for purposes which will become apparent from a consideration of the description of the operation of a device which may advantageously utilize the tape 10 of the present invention.

In practice, as noted hereinabove, the yellow spots 16 represent a binary "1" and cyan spots 18 represent a binary "0." As those skilled in the art will recognize, the seven spots forming any one row 14 correspond to the different tracks in the associated device. That is, all the spots near the right hand edge of the tape 10 in each of the rows 14 forms track No. 1. The next adjacent spots in all of the rows 14 form track No. 2. Thus, the tape 10 contains seven different tracks. Additionally, as shown in FIG. 1, the tape 10 is provided with an eighth track or certifying row 22.

The track 22 includes a plurality of longitudinally spaced differently colored spots as opposed to the rows 14 which include transversely spaced spots. The track or certifying row 22 is provided so that the operator can insert authentication and certification information of the tape in the form of bits. More particularly, the certification information is preceded and followed by elongated black bands 24. A green area 20 follows the first black band. Thereafter the differently colored spots 16 and 18 follow the green band 20. These spots are separated by smaller black spots 24.

The tape of the present invention may be fabricated in the following manner. An unexposed strip of photographic film may be illuminated by a green light to produce the green area 20 on the tape 10. If it is desired to place a binary "1" at a point on the tape, a red light is superimposed over the green light on that portion of the film 12. Accordingly, the combination of the green light and the red light will produce the yellow spot 16. If it is desired to produce a binary "0" at a predetermined area on the film 12, a blue light is superimposed over the green light at that portion of the film to produce the cyan spot 18.

Apparatus which may accomplish the above may comprise a series of seven transversely spaced exposure lights in an enclosed housing. Each of the exposure lights is adapted to produce either a red beam or a blue beam in accordance with signals from an information source. The exposure lights are preceded by a lamp which produces a green beam. Accordingly, as the tape is passed below the exposure lights, the green lamp produces the background area 20 and the exposure lights produce the transversely spaced spots forming each of the rows 14. It is obvious that a specific time interval elapses between each operation of the exposure lights so that the rows 14 will be longitudinally spaced from each other. The track 22 may be produced by similar lights which are longitudinally spaced with respect to one another rather than being transversely spaced as is the case with tracks 1 through 7.

After the film 12 has been exposed as, for example, in the manner noted hereinabove, the film is developed to produce the tape 10 having the colored background and the differently colored transversely spaced spots which comprise the longitudinally spaced rows 14. It is to be noted that once the film has been developed the colors of the spots cannot be changed. Accordingly, the tape 10 produces a permanent record which cannot be altered or erased and it is to be distinguished from the magnetic tapes of the prior art which may be erased easily simply by placing the tapes in an external magnetic field.

Additionally, since the spots 16 and 18 are readily observable, the operator can determine the content of the information recorded on the tape 10 simply by noting the sequence of the differently colored spots on the tape. Thus, no additional costly equipment is necessary to convert the information on the tape into comprehensible information.

The track 22 represents binary coded information which is inserted by the operator of the machine. Accordingly, this information may represent a secret programming code which controls the program in an associated computer which then receives the information represented by the binary bits in tracks 1 through 7 and performs the necessary operation on this data to produce a desired result.

In order to prevent the exchanging of an original tape with a photocopy thereof, a clear strip of film 26 is provided. The clear or transparent strip of film 26 is sized to be coextensive with the film strip 12 and overlies the same. The strip 26 may be bonded or otherwise affixed to the film strip 12 in any manner whatsoever so that the two cannot be separated, as shown in FIGS. 2 and 3. The film strip 26 is provided with a photographic emulsion at that portion 28 which overlies the black area 24 forming a part of the eighth track 22. Provided in the portion 28 are indicia 30 which identify the particular tape. The indicia 30 are of a color which will show up against the black background 24, such as white. Thus, the operator simply need note whether or not the tape which he is about to utilize is provided with the correct indicia elements to determine whether or not he is in possession of the original tape or a copy thereof.

The tape 10 of the present invention may be used in conjunction with reading apparatus designated generally by the numeral 32 in FIG. 4. The reading apparatus 32 includes a plurality of transversely spaced photoelectric cell housings respectively designated by the numerals 34–36. Each of the housings 34–46 includes two photoelectric cells, one of which is responsive to the cyan spot 18 and the other of which is responsive to the yellow spot 16. Accordingly, when a yellow spot 16 is sensed by one of the housings 34–46, one type of signal will be produced. When a cyan spot 18 is sensed by the housings 34–46 another type of signal will be produced. Thus, the color coded binary "1" and "0" will be converted into appropriate electrical signals by the photoelectric cell housings 34–46.

Provided at the left-hand end of the reading apparatus 32 are eight longitudinally spaced photoelectric cell housings. Only one housing 48 is shown in FIG. 4. This plurality of photoelectric cell housings are spaced apart by a distance corresponding to the spacing between the colored spots in the track 22. Moreover each one of these housings is adapted to sense a different one of the areas comprising the spot 22. For example, the housing 48 is adapted to sense the green area 20 portion of the track 22. The housing immediately behind the housing 48 would sense the color of the spot occupying the first colored spot following the black band 24 separating the green area 20 from this next spot. Thus, in the present example as shown in FIG. 1, the housing would sense the yellow spot 16.

Located beneath each one of the photocell housings 34–48 and the remainder of the photocell housing which sense the track 22 are different light sources (not shown). The light sources and the respective photoelectric cell housings are aligned with each other and with the tracks 1 through 8 on the tape 10.

In operation, the tape 10 is moved passed the reading apparatus 34 in the direction indicated by arrowhead 50 in FIG. 1. When the green area 20 in the track 22 is sensed by the photoelectric cell housing 48, the housing 48 may produce a signal which activates the remaining photoelectric cells which sense the track 22. If the track 22 contains a preselected binary code, the signals produced by the housings sensing the track 22 may actuate an associated computer (not shown) to control a preselected program. Hence, the information represented by the different colored spots 16 and 18 in the tracks 1 through 7 will be acted upon in a predetermined manner to produce the desired result.

Assuming that the track 22 contains the correct code, the photoelectric cell housings 34–46 will sense the binary information represented by the differently colored spots 16 and 18 comprising each one of the longitudinally spaced rows 14. This binary information will be converted into electrical signals in the conventional manner thereby to provide a signal source for the associated computer.

The photoelectric cell housings 34–48 may be preceded by a photoelectric cell housing which is responsive to the green area 20 on the tape 10. This photoelectric cell housing will produce a constant bias or signal as the tape is moved below the reading apparatus. However, if the tape 10 tears the housing responsive to the green color will cease to produce a signal. Thus, the absence of a signal from this photoelectric cell housing may be utilized to stop the operation of the associated machinery.

Accordingly, a tape has been provided for permanently recording information in binary form thereon which cannot be altered or changed or otherwise tampered with as in the case of magnetic tapes.

While a preferred embodiment of the present invention has been shown and described herein it will become obvious that numerous omissions, changes and additions may be made in such embodiment without departing from the spirit and scope of the present invention.

What is claimed is:

1. A permanent data-processing record comprising a longitudinal strip of film, said strip of film having longitudinally spaced rows of transversely spaced multi-colored spots, the areas between said rows and said spots being the first color, said spots being of a color other than said first color, whereby said spots represent bits of data, and a certifying row of longitudinally spaced multi-colored spots, each of said spots in said certifying row being spaced from the adjacent spot by a fourth colored section, said fourth colored section being different than said first color and said spot colors.

2. A permanent data-processing record as in claim 1, in which some of said spots are of the second color and the remaining spots are of a third color,
said first, second and third colors being different from each other.

3. A permanent data-processing record as in claim 1, and means for identifying said record,
said means including a transparent cover superposed on said strip of film, and
indicia means on said cover identifying said record.

4. A permanent data-processing record as in claim 3, in which said covering is coextensive with said film.

5. In combination, a permanent data-processing record and means for reading said record; said record comprising a longitudinal strip of film, said strip of film having longitudinally spaced rows of transversely spaced multi-colored spots thereon, the number of spots in each row of spots being equal, said spots being positioned so that respective ones of the spots in one row of spots are aligned with corresponding ones of the spots in the other rows of spots to provide respective tracks, the areas between said rows of said spots being a first color, each spot forming a row of spots being of a second or third color in accordance with the data to be recorded, said first, second and third colors being different from each other; said means for reading said record comprising a plurality of reading means in one-to-one correspondence with said tracks positioned above said film and transversely spaced from each other so that each reading means is aligned with the respective spot in a row, said reading means being responsive to said second and third colors for producing an electric signal representative of the color of the spot passing therebelow.

6. The combination of claim 5, and
biasing means responsive to said first color for producing a biasing signal to control the operation of an associated device.

7. The combination of claim 5,
in which said film is provided with a certifying row of differentially colored spots,
said certifying row comprising a plurality of spots longitudinally spaced from each other by a spot having a fourth color, and
sensing means responsive to the colors of said spots in said certifying row for producing a certifying signal.

References Cited

UNITED STATES PATENTS

| | | | |
|---|---|---|---|
| 1,830,468 | 11/1931 | Kelley | 352—234 |
| 2,268,498 | 12/1941 | Bryce | 235—61.115 XR |
| 2,282,029 | 5/1942 | Bryce | 235—61.115 XR |
| 2,760,404 | 8/1956 | King | 235—61.115 XR |
| 2,899,132 | 8/1959 | Orthruber. | |

MAYNARD R. WILBUR, Primary Examiner

S. SHEINBEIN, Assistant Examiner

U.S. Cl. X.R.

235—61.12; 250—219; 352—234